Figure 1:
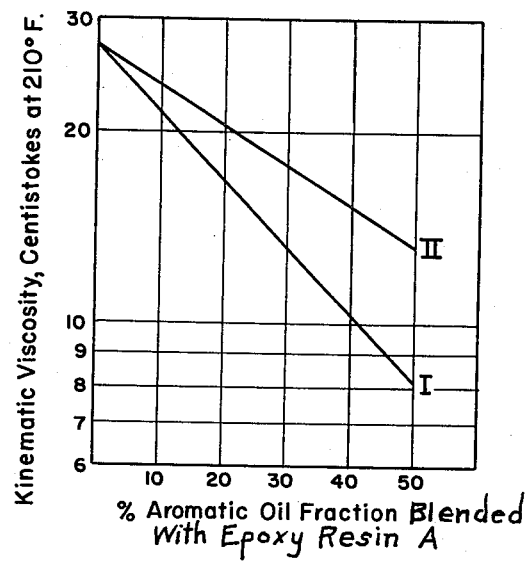

Nov. 6, 1962

A. H. BOENAU ET AL 3,062,771

COMPOSITIONS OF EPOXY RESIN AND AROMATIC HYDROCARBON OILS

Filed Oct. 8, 1958

INVENTORS.
Arthur H. Boenau
Paul F. Bruins
Robert H. Salvesen by *Charles G. Huggett*

ATTORNEY.

United States Patent Office 3,062,771
Patented Nov. 6, 1962

3,062,771
COMPOSITIONS OF EPOXY RESIN AND AROMATIC HYDROCARBON OILS
Arthur H. Boenau, Flushing, and Paul F. Bruins, Douglaston, N.Y., and Robert H. Salvesen, Clark Township, Union County, N.J., assignors to Socony Mobil Oil Company, Inc., a corporation of New York
Filed Oct. 8, 1958, Ser. No. 766,126
13 Claims. (Cl. 260—33.6)

This invention relates to modified epoxy compositions which have improved properties both before and after curing. These modified epoxy compositions have applications as coatings, castings, reinforced laminates, foams and adhesives.

The expoxy resins are quite well known and are used for a variety of purposes as coating compositions. These resins have been used extensively in the electrical field as insulating materials, particularly in complex trace circuits which are dipped in the liquid resins at the time of curing, the process being defined as encapsulation. Such circuits are used extensively in rockets as well as in other modern-day complicated machines requiring extensive electrical circuitry. The resins have also been used in the embedding of electrical components in the insulating material, the process being defined as potting.

While the epoxy resins have shown outstanding results in the above described uses, improved electrical resistance is desired and furthermore improved physical characteristics of the cured resin are desired to insure against breakdown and the development of short circuits. The epoxy resins are expensive and it is therefore desirable to improve the properties of the resins while reducing the expense of the finished product.

We have discovered an improved composition having physical, chemical and electrical properties as good or better than unmodified cured epoxy resins which incorporates a substantial amount of material less expensive than the unmodified epoxy resins, thereby providing an improved finished product. This improved composition has many useful applications. It may be used in the potting and/or encapsulation of delicate electrical components or it may be used as a protective coating for resistance to severe corrosive conditions.

A broad object of this invention is to provide a lower cost, modified epoxy composition with improved electrical, physical and mechanical properties as compared to the unmodified epoxy resins.

A further object is to provide an improved modified epoxy composition for use as an electrical resistant material in potting and encapsulation of electrical components. The improvement includes reduction in viscosity of the liquid resin, longer pot life for the catalyzed resin, equal or better electrical properties such as dielectric strength, dielectric constant, dissipation factor and power factor.

A further object of the invention is to provide a chemically resistant coating composition which may be cured at either room temperature or elevated temperature and which may be used without or with pigmentation and fillers. These coatings may be made in unlimited selection of color by the use of an appropriate modifying agent.

A further object of the invention is to provide a modified epoxy composition with improved flexibility which improves the application of a modified resin as coatings, castings, reinforced laminates, foams and adhesives, in providing resistance to mechanical and thermal shock.

A further object of the invention is to provide a modified epoxy composition which is more versatile in control of pot life after the addition of well known epoxy curing agents.

In a broad aspect, the invention involves a blending of a glycidyl polyether resin (epoxy resin) with a selected high boiling aromatic hydrocarbon distillate prior to the use of well known curing agents for the epoxy ethers. The selected high boiling aromatic hydrocarbon is essentially an alkyl substituted polynuclear aromatic hydrocarbon in the boiling point range of from 480° F. to about 1000° F. The broad boiling point fraction may be employed for this modification or selected boiling range fractions such as the 580 to 700° F. fraction or the 700 to 850° F. fraction. These fractions or the total distillate have been found to be completely compatible with various of the epoxy resins and the resulting modified epoxy resins may be cured with the known curing agents to provide useful products.

In Arvin Patent Number 2,060,716 the use of very light aromatics as a solvent in the preparation of the resin is taught. However, these aromatics are intended only for the purpose of obtaining fluidity during the application of the film and the solvent must evaporate from the film in order to form the desired film coating.

In Bradley Patent Number 2,528,417 the use of a phenolic pitch with epoxy resins is taught. The pitch is obtained by extracting from cracked petroleum a heavy pitch miscible with ethanol and isopropanol, using aqueous sodium hydroxide as the extracting medium. The principal constituents of the Bradley pitch are high boiling alkyl phenols.

In Whittier Patent Number 2,765,288 the use of coal tar pitch with epoxy resins is taught. This material is a hard solid at room temperature which can only be blended with the epoxy resins by melting at about 100–200° F. It is intensely black and therefore produces a blend which is black and opaque. Although this coal tar pitch is compatible with epoxy resins in both the uncured and cured stages it cannot be expected to improve the flexibility of the cured resins. The coal tar pitch consists of more than 50 percent resins, asphaltenes and carbonaceous material, which are responsible for this intense black color.

The epoxy resins contemplted for this invention are those described in U.S. Patent Numbers 2,765,288 of October 2, 1956, and 2,528,417 of October 31, 1950, and 2,500,449 of March 14, 1950. They contain, in addition to ethereal oxygen, glycidyl groups in such quantity that the material has a 1,2-epoxy equivalency in the average molecule of greater than one and as much as two or more. By the epoxy equivalency reference is made to the average number of 1,2-epoxy groups

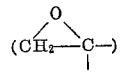

contained in the average molecule of the ether. In the case where a substantially pure simple compound is used, the epoxy equivalency will be an integer of two or more. For example, the epoxy equivalency of diglycidyl ether or of the diglycidyl ether of ethylene glycerol is two, while that of triglycidyl ether of glycerol is three. However, the glycidyl ether may be a mixture of chemical compounds which, although they are of similar identity and chemical constitution, have different molecular weights. The measured molecular weight of the mixture upon which the epoxy equivalency is dependent will necessarily be an average. Consequently, the epoxy equivalency of the glycidyl ether mixture will not necessarily be an integer of two or more, but will be a value which is greater than one. For example, a glycidyl ether particularly suitable for use in the invention is that made by reacting bis-(4-hydroxyphenyl)-2,2-propane with epichlorhydrin in the presence of an alkali at a mole ratio of about 1.4 mols of epichlorhydrin per mol of the dihydric phenol. The product is a solid resinous mixture of glycidyl ethers for a measured average of molecular weight of 791. Analysis shows the product to contain about 0.169 equivalent of epoxy groups per 100 grams. Consequently, the product has an epoxy equivalency of about 1.34, i.e., an average of about 1.34 epoxy groups per molecule.

There are two other definitions for epoxy content of epoxy resins, namely, epoxy value, which is defined as the number of epoxy groups per hundred grams of resin, and epoxide equivalent, which is defined as the number of grams of resin containing one epoxy group.

A preferred group of epoxy ethers for use in this invention is prepared by reacting a dihydric phenol with epichlorhydrin in alkaline solution. The products formed by this reaction are resinous in character. Any of the various dihydric phenols are used in preparing the glycidyl ethers including mononuclear phenols like resorcinol, catechol, hydroquinone, etc., or polynuclear phenols like bis-(4-hydroxyphenyl)-2,2-propane (bisphenol A), 4,4'-dihydroxy benzophenone, bis-(4-hydroxyphenyl)-1,1-ethane, bis-(4-hydroxyphenyl)-1,1-isobutane, bis-(4-hydroxyphenyl)-2,2-butane, bis-(4-hydroxy-2-methylphenyl)-2,2-propane, bis-(4-hydroxy-2-tertiary butyl phenyl)-2,2-propane, bis-(2-dihydroxynaphthyl)-methane, 1,5-dihydroxy naphthalene, etc.

The glycidyl ethers of the dihydric phenols are prepared by heating the mixture of dihydric phenol with epichlorhydrin using two or more moles of epichlorhydrin per mole of the dihydric phenol. A base such as sodium or potassium hydroxide is present during reaction and after a prolonged period of heating, the reaction mixture is converted to a resinous substance. The reaction product is washed with water to remove the base. This product may be represented by the formula:

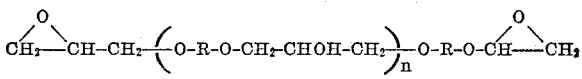

wherein R represents the divalent hydrocarbon radical of the dihydric phenol and $n$ is an integer of the series 0, 1, 2, 3, etc. The length of the chain can be made to vary by changing the molecular proportion of epichlorhydrin and dihydric phenol. Thus, by decreasing the moles of epichlorhydrin per mole of dihydric phenol from about two downwards toward one, the molecular weight and the softening point of the resinous glycidyl is increased. In general, these glycidyl ethers, having an epoxy equivalency between one and two, contain terminal 1,2-epoxy groups, and have alternate aliphatic and aromatic groups linked together by ethereal oxygen atoms. The preferred epoxy ethers for use in the invention are those having epoxy values no less than 0.20 (Pyridinium Chloride Method) and melting points no greater than 80° C. (Durran's Mercury Method) with the most preferred epoxy ether having epoxy values between 0.2 and 0.6. The preferred phenol is bisphenol A.

Less preferably, there can be used 1,2-epoxy-containing polyethers of polyhydric alcohols, such as polyglycidyl ethers thereof like the diglycidyl ether of ethylene glycol, propylene glycol, trimethylene glycol, diethylene glycol, triethylene glycol, glycerol, dipropylene glycol and the like. Other typical ethers of this class include glycidyl ethers of polyhydric alcohols having a 1,2-epoxy equivalency greater than one, such as polyglycidyl ethers of glycol, diglycerol, erythritol, pentaglycerol, mannitol, sorbitol, polyallyl alcohol, polyvinyl alcohol, and the like.

The epoxy resins modified with the alkyl substituted polynuclear aromatic oil of this invention may be cured with any of the known curing agents for epoxy resins. The amount of curing agent employed is based on the amount of epoxy resins present in the composition. Among the well known curing agents are two categories, namely, amines and acids and acid anhydrides. For this purpose there may be used small amounts of polyfunctional amines, such as ethylene diamine, diethylene triamine (DETA), triethylene tetramine (TETA), tetraethylene pentamine, benzyl dimethylamine, metaphenylene diamine, metaxylylene diamine (MXDA), dimethylaminopropylamine, polyamides such as the commercially available Versamids and adducts of these amines either singly or in blends and the like. Among the many acids and acid anhydride curing agents which may be used for the curing of these modified epoxy resins are phthalic, methyl nadic, succinic, dodecyl-succinic (DDSA), maleic, pyromellitic and tricarballylic acid anhydrides, etc. The indicated abbreviations for these curing agents are employed in the subsequent examples and tables. The amount of the curing agent employed varies widely with the particular nature of the curing agent and is well known to those skilled in the art.

The conditions for curing also vary widely with the type of curing agent employed. Some of these curing agents may effectively be used at room temperature, whereas others require prolonged heating at elevated temperatures. The room temperature curing agents lead to short pot life following the addition of the curing agent (namely, time from addition of curing agent to gelling) whereas the agents requiring elevated temperatures and long time lead to prolonged pot life at room temperature. An interesting advantage gained by the use of the alkyl substituted polynuclear aromatic oil is a tendency to prolong the pot life at room temperature which is frequently advantageous. This extension of the pot life may be as much as five fold in the case of the more reactive room temperature curing agents. A typical example of this effect is illustrated in the following data:

TABLE I

*Effect of Modifier on Pot Life*

| Epoxy resin used | Reaction product of bisphenol A and epichlorhydrin (Epon 828) | |
|---|---|---|
| Modifier used | None | 580–700° F. aromatic oil. |
| Modifier, phr.[1] | | 100. |
| Type curing agent used | DETA | DETA. |
| Curing Agent Used, phr.[1] | 10 | 10. |
| Length of time to gel at room temperature, minutes | 3–4 | 15–20. |

[1] The abbreviation phr. refers to parts per 100 parts of resin, by weight

A marked reduction in viscosity of the epoxy resin was obtained by addition of the alkyl substituted polynuclear aromatic oil. Evidence of this may be seen in FIGURES 1 and 2. Curve number 1 of FIGURE 1 shows the reduction in viscosity of a blend of the 580–700° F. fraction with epoxy resin A while curve number 2 shows a similar reduction in viscosity of a blend of the 700–850° F. fraction with epoxy resin A. The nature of the fractions of the aromatic oil is shown in Table II while the epoxy resin A is identified in Table IV.

Figure 2:
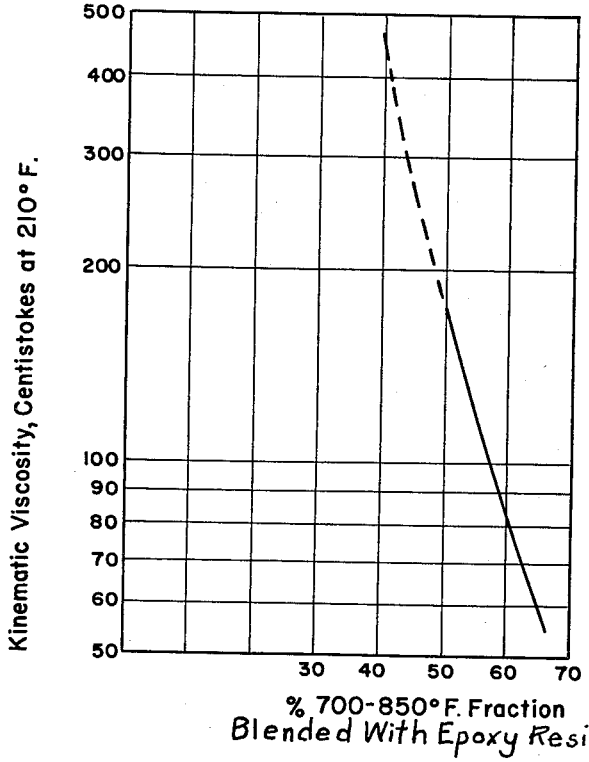

FIGURE 2 gives viscosity data on a blend of epoxy resin C with the above 700–850° F. fraction. The blending of the alkyl substituted polynuclear aromatic oil with the epoxy resins may be accomplished in proportions ranging from one part to as high as 100 parts of the aromatic oil per hundred parts of the resin without incompatibility in either the liquid state or the cured state. This blending may be done at room temperature or more easily at temperatures in the range of 100° F. to 130° F. In most cases a decreased viscosity resulting from the elevated temperature combined with the use of the modifying agent is advantageous. These blends are stable over indefinite periods showing no tendency to separate, cure or absorb moisture and increase in viscosity on exposure to humidity as some commercially available modifiers are prone to do. The curing agent should be added to the blend shortly before the intended use of the composition.

It is desirable to have a pure alkyl substituted polynuclear aromatic oil as the modifying agent. It is extremely difficult commercially to produce a one hundred percent pure product. However, the use of thermal or catalytic processes results in the building up of the aromatic fractions and a cracking of the paraffinic fractions which therefore makes it feasible to produce a highly aromatic material which can be used either in its entirety in the previously mentioned boiling point range or in any desired intermediate cut. Analysis for the paraffinic content of the commercially produced aromatic oils by adsorption on silica gel shows that they contain no more than 8 percent. A preferred oil should contain less than about 6 percent. With these limits we have observed a minimum of oil exudation of paraffinic fractions when such oils are incorporated in epoxy resins. This exudation is not at all apparent in coatings, but becomes noticeable as a slight oil film in large moldings, particularly when cured at elevated temperatures. This slight oil exudation may not be objectionable in many applications but should be kept to a minimum.

It is understood that, in certain instances, as for example, in making coatings, various solvents may be used to obtain fluidity, viz., high flash aromatic naphtha, xylene, toluene, methyl isobutyl ketone, methylethyl ketone, trichlorethylene, dioxane and other well known solvents for epoxy resins. However, these solvents evaporate and are removed from the resin film during the curing stage. In contrast, the selected aromatic oil is retained and becomes intimately bound in the film and remains a part thereof.

The chemical and physical properties of typical alkyl substituted polynuclear aromatic oils are illustrated by the following Table II. Table III, which directly follows Table II, gives the properties of a commercially available coal tar pitch. Such a coal tar pitch is not used alone in epoxy resin formulations but is cut back with about 25–35 percent of a high-flash aromatic naphtha.

TABLE II

| Fraction of selected aromatic oil, °F | 580–700 | 700–850 |
|---|---|---|
| Gravity, specific ASTM: D1298 | 1.0505 | 1.0757 |
| Pour point, °F., ASTM: D97 | +30 | 85 |
| Flash point, COC, °F., ASTM: D92 | 325 | 405 |
| Color, ASTM, ASTM: D155 | 3 | Yellow |
| Kinematic viscosity at 100° F., centistokes, ASTM: D445 | 10.3 | |
| Kinematic viscosity at 130° F., centistokes, ASTM: D445 | | 27.1 |
| Kinematic viscosity at 210° F., centistokes, ASTM: D445 | | 5.4 |
| Mixed aniline cloud point, °F., ASTM: D611 | 75.0 | 103.6 |
| Aromatics, weight percent | 92 | 92 |
| Pariffins, weight percent | 6.4 | 4.8 |
| Resin, weight percent | 1.0 | 2.4 |
| Asphaltenes, weight percent | <0.1 | <0.1 |
| Oxygen, weight percent | | 0.68 |
| Nitrogen, weight percent | | 0.11 |
| Sulfur, weight percent | | 2.65 |
| Nature of aromatic components identified by infrared and ultraviolet analyses | (¹) | (¹) |
| Distillation, °F.: | | |
| IBP | 580 | 700 |
| 10% | 606 | |
| 20% | 620 | |
| 30% | 632 | |
| 40% | 641 | |
| 50% | 650 | |
| 60% | 656 | |
| 70% | 660 | |
| 80% | 667 | |
| 90% | 675 | |
| Final boiling point | 704 | 850 |
| Recovery volume, percent | 99 | 98 |

¹ Polynuclear hydrocarbons with alkyl side chains greater than methyl

A coal tar pitch of the character disclosed in U.S. Patent Number 2,765,288 has been analyzed and found to be substantially different from the alkyl substituted polynuclear oil as shown in the following Table III:

TABLE III

*Properties of Coal Tar Pitch*

Product, coal tar pitch:
Aromatics, weight percent _____ 44.2
Paraffins, weight percent _____ 0.2
Resin, weight percent _____ 19.7
Asphaltenes, weight percent _____ 21.0
Carbonaceous, weight percent _____ 14.9
Oxygen, weight percent _____ 1.26
Nitrogen, weight percent _____ 1.05
Sulfur, weight percent _____ 0.54

In the analytical test of both aromatic oil and coal tar pitch samples, the aromatics, paraffins and resin content were determined by adsorption of the sample on a silica gel column and elution of the fractions. Paraffins were stripped from the column with isooctane, aromatics with benzene and resins with ethanolbenzene. Asphaltenes and carbonaceous material were previously separated by precipitation with isooctane. The asphaltenes were taken up in benzene. Residue was carbonaceous material. The aromatic structure was determined by ultraviolet absorption and mass spectrometry. Number of rings per molecule was determined by low voltage ionization technique and side chains were estimated using conventional mass spectrometry, both at 350° C. Kind of alkylation of aromatics was confirmed by infrared absorption in the 3.30–3.40 micron region and by mass spectrometry.

The physical properties of the epoxy resins are described in the following Table IV:

TABLE IV

*Properties of Epoxy Resins Used*

| Resin designation ¹ | A | B | C |
|---|---|---|---|
| Melting point, °C. (Durran's) | Liquid | 40–45 | 64–76 |
| Color, Gardner, max | 12 | 8 | 8 |
| Visc. at 25° C., Gardner-Holdt ² | $Z_5$–$Z_6$+ | $A_1$–B | C–G |
| Visc. at 25° C., centipoise | 10,000–15,000 | 30–70 | 85–170 |
| Epoxide equivalent | 190–210 | 300–375 | 450–525 |
| Weight per gallon, lbs | 10.27 | 9.89 | 10.05 |
| Refractive index at 20° C | 1.573 | 1.592 | 1.595 |
| Equivalent weight | 80 | 105 | 130 |

¹ Examples of commercially available resins which fit these requirements are the following: A—Epon 828, manufactured and sold commercially. B—Epon 864, manufactured and sold commercially. C—Epon 1001, manufactured and sold commercially. (They are all condensation products of bisphenol A and epichlorhydrin.)
² Resin A run straight, other on 40 percent by weight of resin in Butyl Carbitol at 25° C.

The physical properties of three different epoxy resins and blends of them with both the 580–700° F. fraction and the 700–850° F. fraction of the polynuclear aromatic oil are given in Tables V, VI and VII. Also included are tests on a typical cutback coal tar pitch used commercially. Several observations can be made from these data.

(1) All of the modified epoxy resin blends gave dry, hard films under the usual curing conditions employed with the unmodified epoxy resin.

(2) Use of as much as 50 phr. of the polynuclear aromatic oil as a modifier did not seriously detract from the hardness values of the straight epoxy resins. The higher boiling (700–850° F.) fraction gave the best hardness values for the modified resins.

TABLE V

*Data on Various Formulations Using Epoxy Resin A*

| Test number | 1 | 2 | 3 | 4 | 5 | 6 |
|---|---|---|---|---|---|---|
| Modifier used | 580–700 fraction | 700–850 fraction | Cutback coal tar pitch | None | 700–850 fraction | None. |
| Modifier, phr.[1] | 50 | 50 | 50 | | 50 | |
| Curing agent used | TETA | TETA | TETA | TETA | DETA | DETA. |
| Curing agent, phr | 10 | 10 | 10 | 10 | 10 | 10. |
| Curing conditions: | | | | | | |
| Time, hours | 24 | 24 | 24 | 24 | 24 | 24. |
| Temp., °F | 80 | 80 | 80 | 80 | 80 | 80. |
| Quality of film cast on aluminum plate | Dry, hard | Dry, hard | Dry, hard | Dry, hard | Dry, hard | Dry, hard. |
| Quality of bulk casting after add'l. cure of 1 hr. at 210° F. | do | do | do | do | do | Do. |
| Rockwell hardness (scale) (ASTM:D785-51) | | 96(M) | 74(M) | | 96(M) | 96(M). |
| Heat distortion temp., °F. (ASTM:D648-45T) | | | | | | |
| Mandrel test for flexibility passed, diameter of rod, in. | ⅛ | ³⁄₁₆ | | None, up to 1" diameter | | |
| Modulus of rupture, lbs./sq. in. | | | | | | |

| Test number | 7 | 8 | 9 | 10 | 11 | 12 | 13 |
|---|---|---|---|---|---|---|---|
| Modifier used | 580–700 fraction | 700–850 fraction | Cutback coal tar pitch | None | 580–700 fraction | 700–850 fraction | None. |
| Modifier, phr.[1] | 50 | 50 | 50 | | 50 | 50 | |
| Curing agent used | MXDA | MXDA | MXDA | MXDA | DDSA[2] | DDSA[2] | DDSA.[2] |
| Curing agent, phr | 15 | 15 | 15 | 15 | 143 | 143 | 143. |
| Curing conditions: | | | | | | | |
| Time, hours | 16+1½ | 16+1½ | 16+1½ | 16+1½ | 16 | 16 | 16. |
| Temp., °F | 80–200 | 80–200 | 80–200 | 80–200 | 250 | 250 | 250. |
| Quality of film cast on aluminum plate | Dry, hard | Dry, hard | Dry, hard | Dry, hard | Dry, hard | Dry, hard | Dry, hard. |
| Quality of bulk casting after add'l. cure of 1 hr. at 210° F. | do | do | do | do | do | do | Do. |
| Rockwell hardness (scale) (ASTM:D785-51) | 77(M) | 88(M) | 68(M) | 93(M) | | | 92.5(L). |
| Heat distortion temp., °F. (ASTM:D648-45T) | 94 | 122 | 109 | 195 | | | |
| Mandrel test for flexibility passed, diameter of rod, in. | | | | | | | |
| Modulus of rupture, lbs./sq. in. | 13,849 | 15,633 | 14,213 | 24,648 | | | |

[1] Phr. means parts per hundred resin.
[2] An accelerator, benzyl dimethyl amine, was also added (one percent by weight based on the resin).

TABLE VI

*Data on Various Formulations Using Epoxy Resin B*

| Test number | 14 | 15 | 16 | 17 | 18 | 19 | 20 | 21 |
|---|---|---|---|---|---|---|---|---|
| Modifier used | 580–700 fraction | 700–850 fraction | 700–850 fraction | Cutback coal tar pitch | None | 580–700 fraction | 700–850 fraction | None. |
| Modifier, phr | 50 | 100 | 50 | 50 | | 50 | 50 | |
| Curing agent used | TETA | TETA | TETA | TETA | TETA | DETA | DETA | DETA. |
| Curing agent, phr | 10 | 10 | 10 | 10 | 10 | 10 | 10 | 10. |
| Curing conditions: | | | | | | | | |
| Time, hours | 24 | 24 | 24 | 24 | 24 | 24 | 24 | 24. |
| Temp., °F | 80 | 80 | 80 | 80 | 80 | 80 | 80 | 80. |
| Quality of film cast on aluminum plate | Dry, hard | Dry, hard | Dry, hard | Dry, hard | Dry, hard | Dry, hard | Dry, hard | Dry, hard. |
| Quality of bulk casting after add'l. cure of 1 hr. at 210° F. | do | do | do | do | do | do | do | Do. |
| Rockwell hardness (scale) (ASTM: D785-51) | 76(M) | 44(M) | 79(M) | 46(M) | 95(M) | 50(M) | 65(M) | 55(M). |

TABLE VII

*Data on Various Formulations Using Epoxy Resin C*

| Test number | 22 | 23 | 24 | 25 | 26 |
|---|---|---|---|---|---|
| Modifier used | 580–700 fraction | 580–700 fraction | 700–850 fraction | Cutback coal tar pitch | None. |
| Modifier, phr | 100 | 50 | 50 | 50 | |
| Curing agent used | TETA | TETA | TETA | TETA | TETA. |
| Curing agent, phr | 10 | 10 | 10 | 10 | 10. |
| Curing conditions: | | | | | |
| Time, hours | 24 | 24 | 24 | 24 | 24. |
| Temp., °F | 80 | 80 | 80 | 80 | 80. |
| Quality of film cast on aluminum plate | Slight oil film | Dry, hard | Dry, hard | Slight oil film | Dry, hard. |
| Quality of bulk casting after add'l. cure of 1 hr. at 210° F. | do | do | do | Dry, hard | Do. |

The electrical properties of various liquid epoxy resins modified with the alkyl substituted polynuclear aromatic oil using various proportions, curing agents and conditions of cure are shown in Table VIII. From the following table it can readily be seen that the presence of the modifying aromatic oil markedly improves the electrical properties of amine cured compositions which therefore widens the utility of the amine cured epoxy composition. The excellent properties of the acid or acid anhydride cured epoxy resins are well known and it can be seen that the excellent properties are retained even though the resin is modified.

The electrical properties of liquid epoxy resins modified with the alkyl substituted polynuclear aromatic oil using varying proportions, curing agents and conditions of cure are shown in Table VIII. The excellent properties of the acid or acid anhydride cured epoxy resins are well known, and it can be seen that the excellent properties are retained even though the resin is modified. The color of the cured modified epoxy resins was such that it was easy to see through relatively thick castings. This is a prime requisite for many electrical applications.

Of greater significance than the above was the discovery that incorporation of the alkyl substituted polynuclear aromatic oil as the modifier for epoxy resins permitted the use of amine curing agents which gave a cured resin of excellent electrical properties. Of particular note are the low values for the dissipation factor with the modified resins. Use of conventional fillers such as mica could be expected to improve these properties further.

excess solution allowed to drain. The liquid film was then allowed to set to a fairly rigid consistency.

The dipping process was repeated twice more using fresh samples of the resin. After the last dip the steel rods were cured for a minimum of 24 hours at room temperature followed by 24 hours at 125° F.

The excellent chemical and solvent resistance of the modified epoxy system as compared to the unmodified resins may be noted. Of particular significance is the increased resistance to chemical attack by 30 percent sulfuric acid, 10 percent nitric acid, 10 percent hydrochloric acid, 5 percent acetic acid, 20 percent acetic acid and 10 perent sodium hydroxide. Also, the modified epoxy resins have improved resistance to acetone. The comercial significance of these improvements is apparent.

The procedure for making the test specimens shown in the previous tables is illustrated in the following examples.

TABLE VIII
*Electrical Properties*

| | | | | | | | | |
|---|---|---|---|---|---|---|---|---|
| Epoxy resin used | A | A | A | A | A | A | A | A. |
| Modifier used | 580–700 fraction. | 580–700 fraction. | 700–850 fraction. | 700–850 fraction. | 580–700 fraction. | 700–850 fraction. | None | None. |
| Modifier, phr | 50 | 50 | 50 | 50 | 100 | 100 | | |
| Type curing agent used | DDSA | MXDA | DDSA | MXDA | DDSA | DDSA | DDSA | MXDA. |
| Curing agent, phr | 143 | 15 | 143 | 15 | 143 | 143 | 143 | 15. |
| Curing conditions: | | | | | | | | |
| Time, hrs | 16 | 16+1½ | 16 | 16+1½ | 16 | 16 | 16 | 16+1½. |
| Temp., °F | 250 | 80–200 | 250 | 80–200 | 250 | 250 | 250 | 80–200. |
| Color of casting | Transparent yellow. | Transparent yellow. | Transparent maroon. | Translucent yellow green. | Transparent yellow. | Transparent maroon. | Clear white | Clear white. |
| Dielectric constant ASTM: D150. | 3.43 | 3.78 | 3.38 | 4.01 | 3.87 | 3.75 | 3.35 | 4.56. |
| Dissipation factor ASTM:D150 | 0.0087 | 0.0102 | 0.0069 | 0.0088 | 0.0319 | 0.0143 | 0.011 | 0.0305. |
| Power factor ASTM: D150 | 0.0087 | | 0.0069 | | 0.0319 | 0.0143 | 0.011 | 0.0305. |
| Dielectric strength, volts./mil.: | | | | | | | | |
| Short time | 440 | | 460 | | | | 410 | |
| ASTM: D149, step-by-step | 400 | | 410 | | | | 380 | |
| Volume resistivity, ohms/cm. ASTM: D257. | $4.6 \times 10^{15}$ | | $4.6 \times 10^{15}$ | | | | $3.0 \times 10^{15}$ | |

A comparison of the chemical resistance of the alkyl substituted polynuclear aromatic oil modified epoxy system using various proportions and two epoxy resins is shown in Table IX. The resins and modified resins shown in Table IX were prepared by diluting them with 10 percent by weight of methyl isobutyl ketone (based on the weight of resin) before adding the curing agent. This was done to make it easier to apply on the test specimens, and also to extend the pot life. The curing agent used in all tests shown in Table IX was 10 phr. of TETA.

Each of the blends prepared was coated onto a separate steel rod that had been sandblasted. The coatings were applied by dipping the rods in the resin and the

EXAMPLE I (See Table VII, Test 23)

36.4 grams of a 75 percent solution of Resin C in xylene were blended at 49° C. with 13.6 grams of a selected aromatic fraction of petroleum boiling in the range of 580–700° F. To the resulting clear homogeneous solution at 120° F. (49° C.), 2.73 cc. of triethylene tetramine were added. Films of the finished warm blend were cast on aluminum plates and cured at room temperature for 24 hours. The resulting film was hard and flexible and showed no evidence of oil exudation.

(Example illustrates use of lightest fraction of selected

TABLE IX
*Chemical Resistance*

| | | | | | | |
|---|---|---|---|---|---|---|
| Epoxy resin used | A | A | A | A | C | C. |
| Modifier used | None | 580–700 fraction | 700–850 fraction | Coal tar pitch cutback | None | L700–850 fraction. |
| Modifier, phr | | 50 | 50 | 50 | | 50. |
| Resistance of coating to: | | | | | | |
| Acetone | Failed in 4 hrs | OK at 44 days | OK at 44 days | OK at 44 days | OK at 2 days, failed <3 days. | OK at 4 hrs., failed <24 hrs. |
| Ethyl acetate | OK at 44 days | do | do | do | OK at 44 days | OK at 44 days. |
| Ethylene dichloride | Failed in 4 hrs | Failed in 4 hrs | Failed in 4 hrs | Failed in 4 hrs | OK in 4 hrs., failed in <24 hrs. | Failed in 4 hrs. |
| Toluene | OK at 44 days | OK at 44 days | OK at 44 days | OK at 44 days | OK at 44 days | OK at 44 days. |
| Stoddard solvent | do | do | do | do | do | Do. |
| 30% sulfuric acid | OK at 14 days, failed <30 days. | OK at 14 days, failed <30 days. | do | do | do | Do. |
| 10% nitric acid | do | do | do | do | do | Do. |
| 10% hydrochloric acid | OK at 6 days, failed <10 days. | OK at 44 days | do | do | do | Do. |
| 5% acetic acid | OK at 14 days, failed <30 days. | OK at 14 days, failed <30 days. | do | do | do | Do. |
| 20% acetic acid | OK at 24 hrs., failed <48 hrs. | OK at 24 hrs., failed <48 hours. | OK at 3 days, failed <6 days. | OK at 2 days, failed <3 days. | OK at 24 hrs., failed <48 hrs. | OK at 10 days, failed <14 days. |
| 10% ammonium hydroxide. | OK at 44 days | OK at 10 days, failed <14 days. | OK at 44 days | OK at 44 days | OK at 44 days | OK at 44 days. |
| 10% sodium hydroxide. | OK at 30 days, failed <44 days. | OK at 44 days | do | do | do | Do. | oil with a film-forming epoxy (Epon 1001) at a 2:1 epoxy hydrocarbon ratio.)

EXAMPLE II (See Table VII, Test 22)

13.3 grams of the same epoxy resin solution used in Example I were blended at 120° F. (49° C.) with 10.0 grams of an aromatic fraction of petroleum boiling in the range of 580–700° F. to obtain a clear, homogeneous solution. After adding 1.0 cc. of triethylene tetramine to the warm blend, films were cast on aluminum plates and cured for 24 hours at room temperature. The cured films were flexible and showed slight evidence of oil exudation or tackiness.

(Example illustrates the use of a 1:1 ratio of the lightest fraction of the selected oil with a film-forming epoxy (Epon 1001).)

EXAMPLE III (See Table VII, Test 24)

This example follows Example I in every detail except that the aromatic fraction of petroleum used boiled in the range of 700–850° F. The cured film was again hard, flexible and showed no evidence of oil exudation or tackiness.

(Example illustrates the use of a 2:1 ratio of the film-forming Epon 1001 with the 700–850° F. fraction.)

EXAMPLE IV (See Table V, Test 5)

20 grams of an epoxy resin A were blended at 120° F. (49° C.) with 10 grams of an aromatic fraction of petroleum boiling in the range of 700–850° F. to yield a clear, homogeneous solution. 2.0 cc. of diethylene triamine were then added at 120° F. and a ½" thick casting was prepared from a fraction of the blend. The casting was cured for 24 hours at room temperature followed by 1 hour at 100° C. The cured casting was very tough, had a Rockwell hardness of 96 (M scale), and showed only a trace of oil exudation.

(Example illustrates use of diethylene triamine as a curing agent for a 2:1 blend of a "potting" resin (Epon 828) and 700–850° F. fraction.)

EXAMPLE V (See Table V, Test 2)

This example follows Example IV in every detail except that triethylene tetramine was used as the curing agent and the blending temperature of resin, hydrocarbon and curing agent was 105° F. In this case the cured casting had a Rockwell hardness of 85 (M scale) and showed a trace of oil exudation.

(Example illustrates use of triethylene tetramine as a curing agent for a 2:1 blend of a potting resin (Epon 828) and 700–850° F. fraction.)

EXAMPLE VI (See Table V, Test 7)

20 grams of epoxy resin A were blended at 120° F. (49° C.) with 10 grams of an aromatic fraction of petroleum boiling in the range of 580–700° F. to yield a clear solution. Three grams of metaxylylene diamine were then added at 120° F. (49° C.) and ½" x 5" x ¼" and ½" x 5" x ⅛" castings were prepared from portions of the blend by pouring into an aluminum mold previously treated with a mold release agent. The castings were cured for 16 hours at room temperature followed by 1½ hours at 200° F. The cured castings were light yellow in color and showed only a trace of oil exudation. A Rockwell hardness of 77 on the M scale was obtained.

This example was repeated using the 700–850° F. fraction instead of the 580–700° F. cut. A greenish-yellow colored bar was obtained which showed only a trace of oil exudation and had a Rockwell hardness of 88 (M scale). (See Table V, Test 8.)

The example was again repeated but this time the hydrocarbon fraction was eliminated. A pale yellow, transparent bar was obtained which had a Rockwell hardness (M scale) of 93. (See Table V, Test 10.)

The example was again repeated using a typical coal tar pitch as the hydrocarbon fraction. A black-opaque bar was obtained which had a Rockwell hardness (M scale) of 68. (See Table V, Test 9.)

NOTE.—The ¼" castings were used for heat distortion tests. The ⅛" castings were used for the modulus of rupture test.

EXAMPLE VII 66.7 grams of epoxy resin A were blended at 120° F. (49° C.) with 33.3 grams of an aromatic fraction of petroleum boiling in the range of 580–700° F. to yield a clear solution. To this solution at 120° F., 95.3 grams of dodecenyl succinic anhydride were added followed by 0.67 cc. of benzyl dimethyl amine. 26 grams of the finished blend were then poured into a circular tin mold (3¾" diam.) which had previously been treated with a mold release agent. The casting was then cured for 16 hours at 120° C. (248° F.) to yield a transparent yellow disc which showed no signs of oil exudation.

(See Table V, Test 11)

This example was repeated using the 700–850° F. fraction. A transparent red-brown disc was obtained which showed no signs of oil exudation.

(See Table V, Test 12)

The example was again repeated but this time the hydrocarbon fraction was eliminated. A pale yellow transparent disc was obtained.

(See Table V, Test 13)

(Example illustrates use of an anhydride curing agent. Samples were used for electrical tests.)

EXAMPLE VIII (See Table VI, Test 19)

20 grams of epoxy resin B were blended at 175° F. (80° C.) with 10 grams of an aromatic hydrocarbon fraction boiling in the range of 580–700° F. to yield a clear fluid solution. Two cubic centimeters of diethylene triamine were added after the blend had cooled to 150° F. Films of the finished blend were cast onto aluminum plates and cured at room temperature for 24 hours. The resulting films were hard and showed no oil exudation.

(Example illustrates use of another epoxy resin (Epon 864). Diethylene triamine curing agent.)

EXAMPLE IX (See Table VI, Test 20)

This example follows Example VIII in every detail except that the aromatic hydrocarbon fraction used boiled in the range of 700–850° F. The cured film was similar to the film obtained in Example VIII with regard to hardness and lack of oil exudation.

(Same as Example VIII but uses different hydrocarbon fraction.)

EXAMPLE X (See Table VI, Test 16)

20 grams of epoxy resin B were blended at 170° F. (77° C.) with 10 grams of an aromatic fraction of petroleum boiling in the range of 700–850° F. to yield a fluid, homogeneous solution. After the blend had cooled to 150° F., two cubic centimeters of triethylene tetramine were added. Films of the finished blend were cast onto aluminum plates and cured at room temperature for 24 hours. The resulting films were hard, flexible and showed no oil exudation.

(Example illustrates use of triethylene tetramine curing agent on Epon 864-hydrocarbon blends (2:1 blends).)

EXAMPLE XI (See Table VI, Test 15)

This example follows Example X in every detail except that 20 grams each of the epoxy resin and hydrocarbon fraction were blended together. The cured films were again hard, flexible and showed no oil exudation.

(Same as Example X but illustrates use of a 1:1 resin to hydrocarbon blend.)

EXAMPLE XII (See Table VI, Test 14)

This example follows Example X in every detail except that the hydrocarbon fractions used boiled in the range of 580–700° F. and the resin-hydrocarbon blend was prepared at 150° F. (66° C.). The cured films were again hard, flexible and showed no oil exudation.

(Same as Example X but illustrates use of the 580–700° F. fraction instead of the 700–850° F. fraction-2:1 resin-hydrocarbon ratio.)

By blending the lighter fractions of the alkyl substituted aromatic hydrocarbon with epoxy resin a very light colored coating composition can be obtained suitable for electrical printed circuits and for other uses where the ability to see through the coating is desired. This is particularly true when using, for example, the 580–700° F. fraction. The 700–850° F. fraction has a deeper yellowish cast but still can be used where visibility is desired. However, when the higher boiling material is included, such as that boiling between about 850° and 1000° F., the composition becomes dark brown and opaque. The 850–1000° F. fraction, however, finds many applications where visibility is not required, and for certain applications is preferred to the lighter fractions.

The examples and tables given hereinabove are supplied to illustrate the nature and scope of the invention and provide an understanding of the invention without in any way limiting the scope of the invention. The only limitations intended are found in the attached claims.

We claim:

1. A composition comprising a glycidyl polyether of a polyhydric phenol having an epoxy equivalency greater than 1, and an alkyl substituted polynuclear aromatic hydrocarbon oil boiling within the range of about 480–1000° F., said oil having an aromatics content of at least 90 percent, a paraffins content of less than 8 percent, the ratio of aromatic oil to polyepoxide being between about 1:1 and 1:100, and a curing agent for said polyepoxide.

2. A composition comprising an epoxy ether resin having a 1,2-epoxy equivalency greater than 1, and an alkyl substituted polynuclear aromatic oil boiling within the range of about 580–700° F., said oil having an aromatics content of at least 90 percent, a paraffins content of less than 8 percent, the ratio of aromatic oil to epoxy resin being between about 1:1 and 1:100, and a curing agent for said epoxy ether resin.

3. A composition comprising a glycidyl polyether of a polyhydric phenol having an epoxy equivalency greater than 1, and an alkyl substituted polynuclear aromatic hydrocarbon oil boiling within the range of about 700–850° F., said oil having an aromatics content of at least 90 percent, a paraffins content of less than 8 percent, the ratio of aromatic oil to polyepoxide being between about 1:1 and 1:100, and a curing agent for said polyepoxide.

4. A composition comprising a glycidyl polyether of a polyhydric phenol having an epoxy equivalency greater than 1, and an alkyl substituted polynuclear aromatic hydrocarbon oil boiling within the range about 700–1000° F., said oil having an aromatics content of at least 90 percent, a paraffins content of less than 8 percent, the ratio of aromatic oil to polyepoxide being between about 1:1 and 1:100, and a curing agent for said polyepoxide.

5. A material capable of being cured with a curing agent to form a finished coating comprising a glycidyl polyether of a polyhydric phenol having an epoxy equivalency greater than 1, and an alkyl substituted polynuclear aromatic hydrocarbon oil boiling within the range about 480–1000° F., said oil having an aromatics content of at least 90 percent, a paraffins content less than 8 percent, with the ratio of aromatic oil to polyepoxide being between about 1:1 and 1:100.

6. The composition of claim 5 in which the boiling range of the aromatic oil is about 580–700° F.

7. The composition of claim 5 in which the boiling range of the aromatic oil is about 700–850° F.

8. The composition of claim 5 in which the boiling range of the aromatic oil is about 700–1000° F.

9. Claim 6 further limited in that the ratio of aromatic oil to epoxy is between 1:2 and 1:1.

10. Claim 7 further limited in that the ratio of aromatic oil to epoxy is between about 1:2 and 1:1.

11. Claim 8 further limited in that the ratio of aromati coil to epoxy is between about 1:2 and 1:1.

12. A composition comprising a glycidyl polyether of a polyhydric phenol having an epoxy equivalency greater than 1, and an alkyl substituted polynuclear aromatic hydrocarbon oil boiling within the range about 700–850° F., said oil having an aromatics content of at least 90 percent, a paraffins content of less than 6 percent, said polynuclear aromatics possessing alkyl side chains substantially longer than methyl, the ratio of aromatic oil to polyepoxide being between about 1:1 and 1:2, and a curing agent for said polyepoxide.

13. A composition comprising: a glycidyl polyether of a polyhydric phenol having an epoxy equivalency greater than 1, and a selected aromatic fraction of petroleum hydrocarbon oil boiling in the range of 700–850° F., said oil having an aromatics content of at least 90%, a paraffin content of less than 6%, the aromatics in said fraction of petroleum oil being polynuclear aromatics possessing alkyl side chains substantially longer than methyl, the ratio of aromatic petroleum oil to polyepoxide being between about 1:1 and 1:2, and a polyfunctional amine curing agent for said polyepoxide.

References Cited in the file of this patent

UNITED STATES PATENTS

| | | |
|---|---|---|
| 2,528,417 | Bradley | Oct. 31, 1950 |
| 2,615,008 | Greenlee | Oct. 21, 1952 |
| 2,709,690 | Narracott | May 31, 1955 |
| 2,765,288 | Whittier et al. | Oct. 2, 1956 |
| 2,889,305 | Lopata | June 2, 1959 |
| 2,906,720 | Simpson | Sept. 29, 1959 |